US006364211B1

(12) United States Patent
Saleh (10) Patent No.: US 6,364,211 B1
(45) Date of Patent: Apr. 2, 2002

(54) WIRELESS DAMPER AND DUCT FAN SYSTEM

(76) Inventor: Saleh A. Saleh, 195 Aberdeen Dr., Algonquin, IL (US) 60102

(*) Notice: Subject to any disclaimer, the term of this patent is extended or adjusted under 35 U.S.C. 154(b) by 0 days.

(21) Appl. No.: 09/651,405

(22) Filed: Aug. 30, 2000

(51) Int. Cl.[7] ............................. F24F 7/00; G05D 23/00
(52) U.S. Cl. ..................... 236/49.3; 236/51; 165/217
(58) Field of Search ................... 236/49.3, 51; 165/217, 165/212, 214

(56) References Cited

U.S. PATENT DOCUMENTS

| 4,824,012 A | 4/1989 | Tate ......................... 236/49.5 |
| 4,969,508 A | 11/1990 | Tate et al. ............. 236/49.3 X |
| 5,117,900 A | 6/1992 | Cox ......................... 454/256 X |
| D331,389 S | 12/1992 | Bartlett ...................... D13/168 |
| 5,224,648 A | 7/1993 | Simon et al. ................. 236/51 |
| 5,271,558 A | 12/1993 | Hampton ................. 454/258 X |
| 5,326,027 A | 7/1994 | Sulfstede ................ 307/155 X |
| 5,449,112 A * | 9/1995 | Heitman et al. ............ 236/49.3 |
| 5,467,919 A | 11/1995 | Tamblyn .................... 236/49.3 |
| 5,533,668 A * | 7/1996 | Erikson ..................... 236/51 X |
| 5,839,654 A | 11/1998 | Weber ......................... 236/47 |
| 5,927,599 A | 7/1999 | Kath ........................... 236/47 |

* cited by examiner

Primary Examiner—William Wayner
(74) Attorney, Agent, or Firm—Meroni & Meroni, P.C.; Charles F. Meroni, Jr.; Paul D. Pressley (57) ABSTRACT

A temperature regulating apparatus comprising, an airflow rate controller to increase or decrease the flow of air supplied from a central heating ventilation and air conditioning system exiting a duct into a selected area, a portable programmable thermostat and radio frequency transmitter, the transmitter transmitting a radio frequency command signal in response to the thermostat detecting a difference between the ambient temperature and the programmed temperature setting, a radio frequency receiver which supplies power to the airflow rate controller upon receiving the radio frequency command signal from the radio frequency transmitter, a channel selector switch assembly providing a number of unique radio frequency transmission codes that can be transmitted and received by the radio frequency transmitter and radio frequency receiver, and at least two thermostatic switch for deactivating the airflow rate controller when the duct air temperature is within a predetermined upper and lower temperature range.

27 Claims, 5 Drawing Sheets

WIRELESS DAMPER AND DUCT FAN SYSTEM

FIELD OF THE INVENTION

The present invention relates to temperature regulating apparatus, and, more preferably, to a wireless temperature regulating apparatus for increasing and decreasing airflow in a forced-air duct type system on command from a remote thermostat.

BACKGROUND OF THE INVENTION

While central heating and air conditioning has provided for a comfortable environment there are still some drawbacks. In particular, a duct system distributes the cooled or heated air throughout a structure. As the air travels through the ducts and exits into various rooms, it does not distribute evenly. The rate of airflow exiting an air duct in one room may be tremendous, while at another the airflow may be negligible. As a result, certain rooms or areas of a structure may be cooler or hotter than others.

In the past, portable air conditioning units or space heaters have been used in order to further cool or heat individual rooms respectively. This has proven to be a costly solution with inferior results. Rooms tend to become over heated or over cooled with the use of space heaters and portable air conditioners.

Therefore, it is an object of the present invention to provide an apparatus that will work with and improve the overall performance of the existing central heating and air conditioning of a structure.

It is another object of the present invention to provide a cost-effective solution to eliminate the problem of having an over or under conditioned room by controlling the air flow from a duct into that room by way of a remote thermostat using radio frequency signals.

It is yet another object of the present invention to provide a central heating and air conditioning performance enhancing apparatus that is easy to install.

It is still another object of the present invention to provide an apparatus that will maintain the temperature at a desired temperature setting or range without massive fluctuations in temperature.

Other objects and features will become readily apparent when the disclosure is read in combination with the drawings and appended claims.

SUMMARY OF THE INVENTION

What is disclosed is a temperature regulating apparatus comprising, means for controlling the rate of airflow supplied from a central heating ventilation and air conditioning system exiting a duct into a selected area, means for transmitting radio frequency command signals in response to a change in temperature from a predetermined setting, means for receiving the radio frequency command signals transmitted from the transmitting means and supplying power to the airflow rate regulating means, and means for selecting the radio frequency to be transmitted and received by the transmitting and receiving means respectively.

In a preferred embodiment, the airflow rate controlling means comprises a damper having a housing, a blade pivotally mounted within the housing, a motor to rotate the blade about its pivotal axis to an open position when supplied with power, and a return spring biasing the blade in a closed position when the motor is not in operation. The damper may further comprise a pressure relief system preventing the blade to return to a fully closed position to minimize pressure build up within the duct system.

In another embodiment, the airflow rate controlling means comprises a duct fan having a housing, and a motorized fan mounted within the housing, the motor rotating the fan when supplied with power.

In yet another embodiment, the airflow rate controller comprises a duct fan and damper connected to one another in series, and the selected radio frequency of the duct fan and damper receivers are identical in order to receive command signals from a single radio frequency transmitter.

The transmitting means comprises a portable programmable thermostat and radio frequency transmitter in the preferred embodiment. The transmitter transmits a radio frequency command signal in response to the thermostat detecting a difference between the ambient temperature and the programmed temperature setting to activate or deactivate the airflow rate controller.

Also, in the preferred embodiment, the receiving means comprises a radio frequency receiver, which supplies or cuts-off power to the airflow rate controlling means upon receiving a radio frequency command signal from the transmitting means.

The radio frequency selecting means of the preferred embodiment comprises a channel selector switch assembly having an n number of switches providing $2^n$ number of unique radio frequency transmission codes that can be transmitted and received by the transmitting and receiving means so that a number of individual damper and duct fan systems can operate within a single structure without interfering with one another's operations.

In a preferred embodiment, the channel selector switch assembly is comprised of 4 switches providing for $2^4$ or sixteen unique radio frequency transmission codes that can be transmitted and received by the transmitting and receiving means.

The temperature regulating apparatus may further comprise means for deactivating the regulating means when the heating ventilation and air conditioning system is not in operation. In the preferred embodiment, the deactivating means comprises at least two thermostatic switches.

DETAILED DESCRIPTION OF THE PREFERRED EMBODIMENTS

Figure 1:
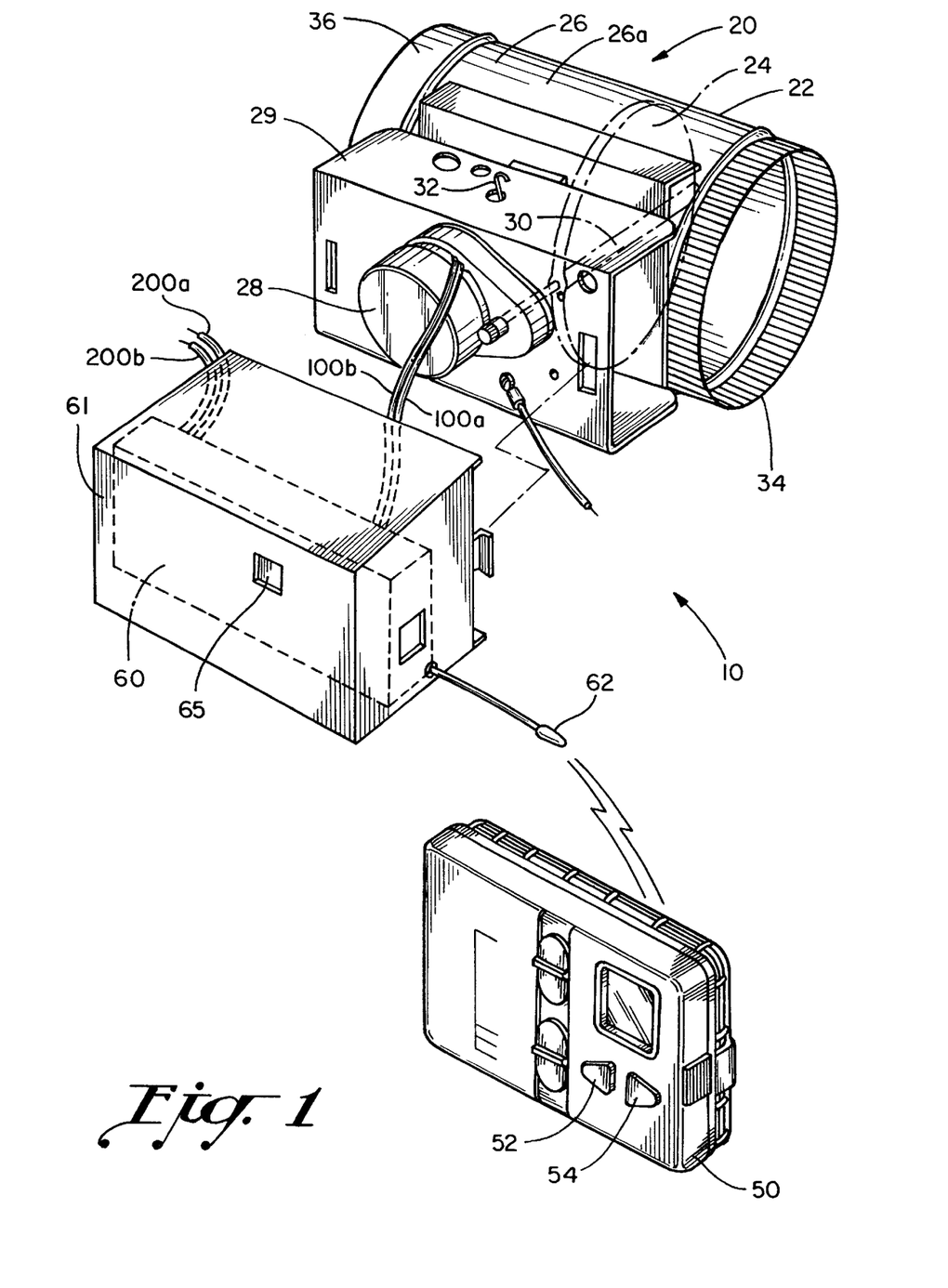
FIG. 1 is a perspective view of the temperature regulating apparatus of the present invention, wherein the airflow rate controller is a damper.
Figure 2:
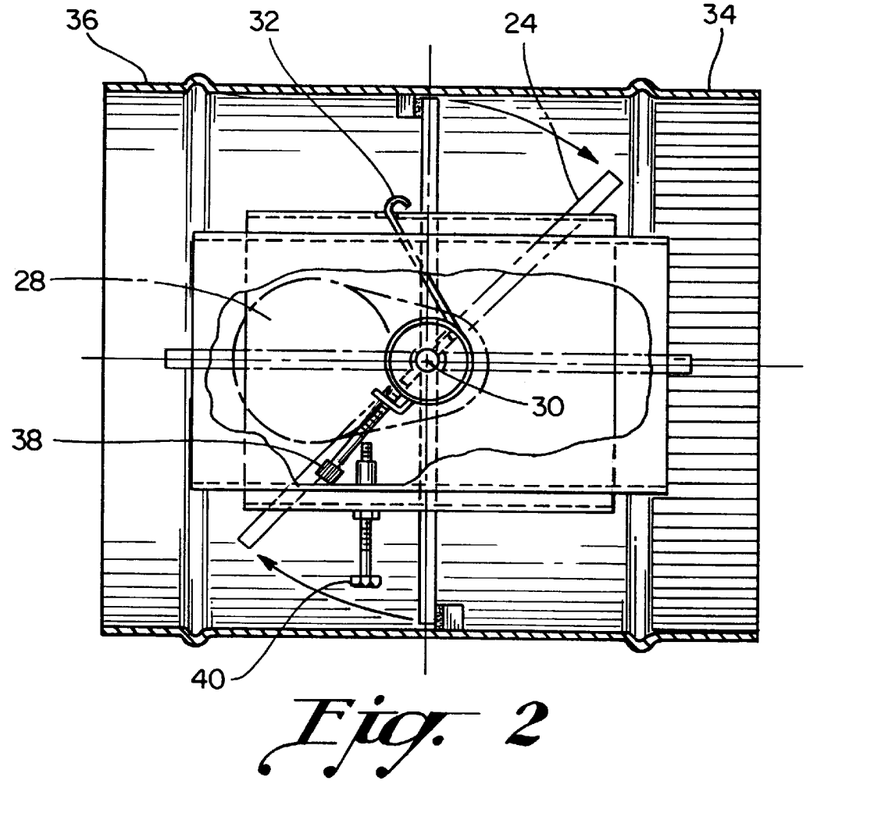
FIG. 2 is a side sectional view of the damper of the present invention.

Turning now to the drawings, and, more particularly, to FIGS. 1 and 2 a temperature regulating apparatus is shown generally at 10. Temperature regulating apparatus 10 is comprised of airflow controller 20, transmitter 50, and receiver 60.

In one embodiment, airflow controller 20 is a damper 22 that restricts the airflow within a duct system. This, in turn, reduces the rate of airflow exiting a duct. Damper 22 is comprised of blade 24 pivotally mounted within housing 26. In one embodiment, housing 26 is cylindrically configured. It is contemplated, however, that housing 26 may be configured in a variety of shapes and sizes such as rectangular for example. Damper housing ends 34 and 36 are tapered to cooperate with existing ductwork. Blade 24 is mounted to shaft 30, which extends out towards motor 28. Motor 28 is mounted outside surface 26a of housing 26 on platform bracket 29. When power is supplied, motor 28 rotates shaft 30 which in turn causes blade 24 to pivot upwards so as to not restrict airflow. When the power supply is cut-off, blade 24 rotates downwardly powered by spring 32 connected to shaft 30 and located between platform bracket 29 and outside surface 26a of housing 26. Spring 32 biases blade 24 in the closed position. Damper 22, however, may be configured so that spring 32 biases blade 24 in the open position, and rotates to a closed position when power is supplied to motor 28.

In the closed position, the tight seal between blade 24 and housing 26 may create positive pressure within the duct system because the air within the duct cannot escape. To avoid pressure build-up, the rotation of blade 24 can be limited to prevent it from fully closing. In this manner a gap can be provided to let air flow continuously to avoid pressure build-up. Arm 38 attaches to and extends perpendicularly from shaft 30 and rests up against stopper 40, which prevents shaft 30 from rotating to full closure. Stopper 40 may be raised or lowered to increase or decrease the size of the gap.

Transmitter 50 transmits a radio frequency control signal to activate motor 28 when an associated thermostat detects a difference between the ambient temperature and a preset temperature. The preset temperature can be programmed in by buttons 52 and 54. When the ambient temperature exceeds or falls below the preset temperature, a radio frequency control signal is transmitted to the damper so that motor 28 may either open (if blade 24 is biased in the closed position) or close (if blade 24 is biased in the open position) blade 24 to allow or prevent airflow to exit the duct. This in turn causes the ambient temperature to be raised or lowered. Once the ambient temperature reaches the preset temperature, another radio frequency control signal is transmitted to the receiver 60 to deactivate motor 28. Power is supplied to transmitter 50 either by battery or an AC wall adapter.

Receiver 60 is housed within receiver housing 61 that removably attaches to platform bracket 29. Receiver 60 connects directly to motor 28 through cables 100a,b. Power is supplied to receiver 60 through cables 200a,b. When receiver 60 receives signals from transmitter 50 through antenna 62, power is supplied to motor 28 to rotate shaft 30 and blade 24 either to the open or closed position.

Transmitter 50 and receiver 60 are also provided with channel selector switches assemblies having an n number of switches providing $2^n$ number of unique radio frequency transmission codes that can be transmitted and received by the transmitter 50 and receiver 60 so that a number of individual damper and duct fan systems can operate within a single structure without interfering with one another's operations.

In a preferred embodiment, the channel selector switch assembly is comprised of 4 switches providing for $2^4$ or sixteen unique radio frequency transmission codes that can be transmitted and received by the transmitter and receiver.

Figure 3:
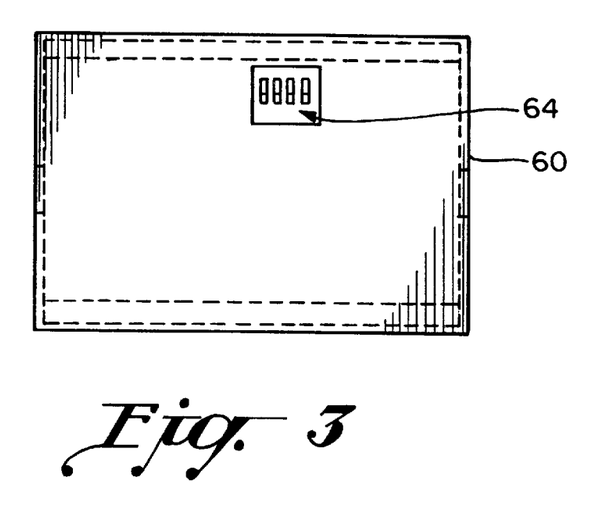
FIG. 3 is a bottom plan view of the receiver of the present invention.

Channel selector switch assembly 64 located on the rear panel of receiver 60 is shown in FIG. 3. Optionally, a selector switch access port 65, as shown in FIG. 3, may be provided so that selector switch assembly 64 may be accessed to change the radio frequency transmission code without having to remove receiver housing 61. Channel selector switch assembly 64 allows for the selection of a number of unique radio frequency transmission code combinations to allow for temperature control in several different zones of a house or structure. That is to say, several different dampers may be used within different ducts in the same structure, and may be independently controlled with separate transmitters. Alternatively, all of the damper receivers may be set to receive the same radio frequency signal, and may then be controlled from a single transmitter.

Figure 4:
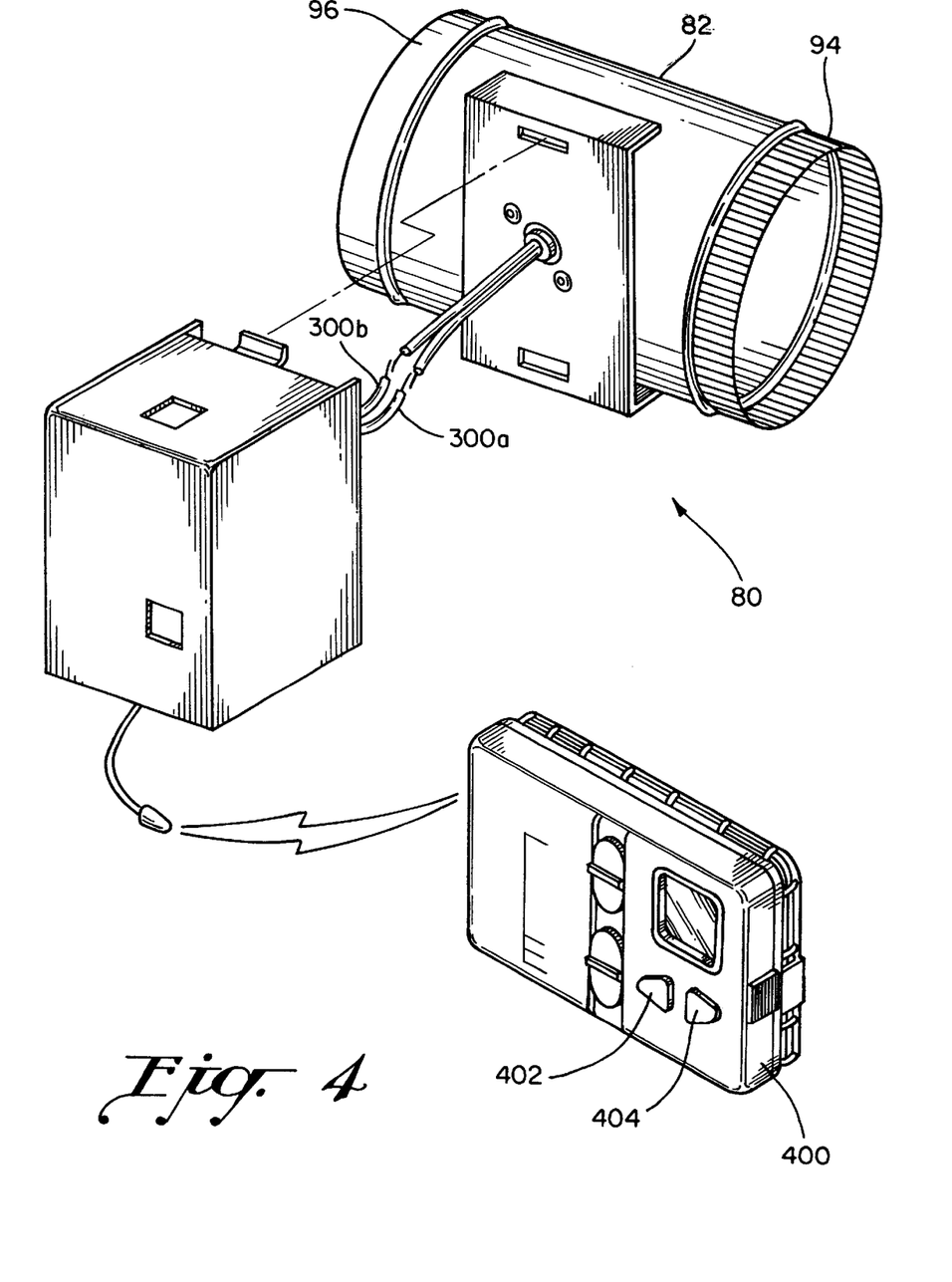
FIG. 4 is a perspective view of the temperature regulating apparatus of the present invention, wherein the airflow rate controller is a duct fan.
Figure 5:
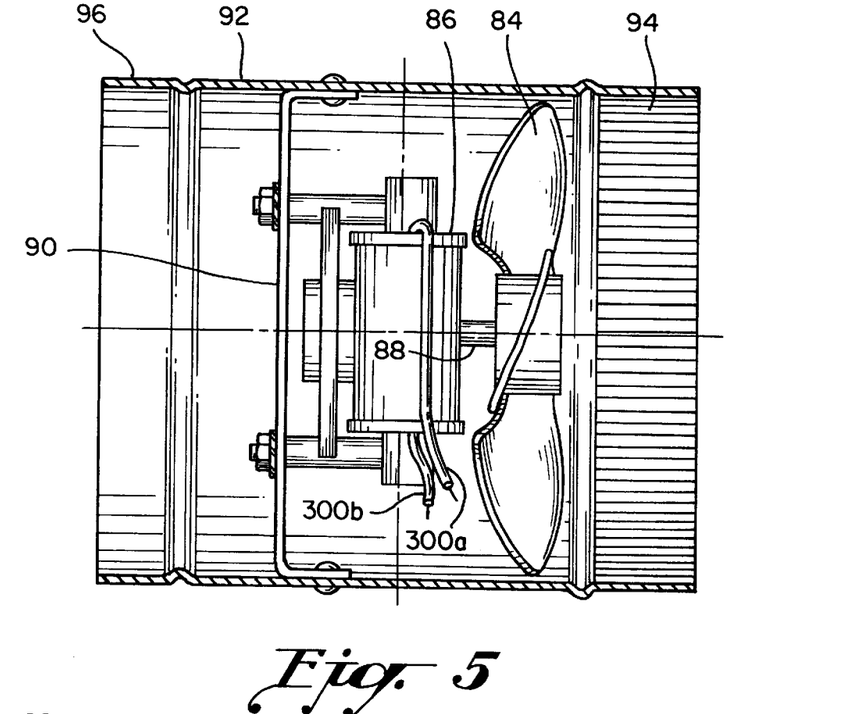
FIG. 5 is a side sectional view of the duct fan of the present invention.

Turning to FIGS. 4 and 5, what is shown is another temperature regulating apparatus shown generally at 80. In this embodiment, the airflow controller is a duct fan or duct fan 82. Duct fan 82 enhances airflow within the duct system. As a result, air exits the duct system at a greater rate than normally possible.

Duct fan 82 is comprised of fan 84 attached to motor 86 by shaft 88. Motor 86 is mounted to plate 90 within housing 92. In one embodiment, housing 92 is cylindrically configured. It is contemplated, however, that housing 92 may be configured in a variety of shapes and sizes such as rectangular for example. Ends 94 and 96 of housing 92 are tapered to cooperate with existing ductwork. Power is supplied to duct fan motor 86 through receiver 98 by cables 300a,b. Duct fan motor 86 can be operated along a broad range of speeds, and in the preferred embodiment, is set to operate at three different speeds.

As before, receiver 98 receives radio frequency signals from transmitter 400 when the ambient temperature deviates from the programmed temperature. The temperature differential is detected by a thermostat, which triggers the transmitter to emit the radio frequency signals. Receiver 98 detects the radio frequency signals, and supplies power to motor 86. As a result, air exits the duct at a greater rate for faster heating or cooling as desired.

Figure 6:
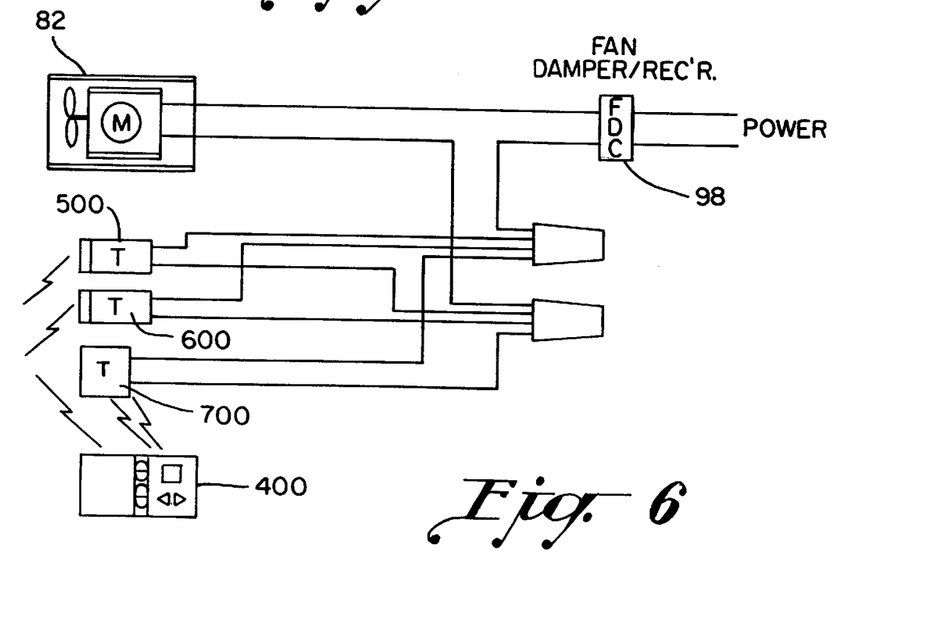
FIG. 6 is a schematic showing the thermostatic switches in parallel.

In the preferred embodiment, duct fan 82 further comprises two bimetal thermostatic switches 500 and 600, and snubber circuit 700 shown in schematic form in FIG. 6. The switches are mounted on the inside surface of the housings. Heating switch 500 and cooling switch 600 prevent duct fan 82 from operating when the central heating and air conditioning unit is not in operation by detecting the duct air temperature. If the duct air temperature is within a predetermined upper and lower temperature range, then the switches are both in the open position. In a preferred embodiment, the upper and lower temperature range is about 125° F. to about 55° F., and more preferably, in a temperature range of about 88° F. to about 65° F. It is contemplated, however, that the temperature range may be broader or narrower depending on the application. This prevents power from reaching the duct fan motor. The switches are electrically connected in parallel to each other, but in series with the motor. This arrangement is intended to enable power to be delivered to the duct fan motor only when the duct air temperature is over or under predetermined upper and lower temperature limits. Snubber circuit 700 reduces or dampens the effect of the arcing across the contacts of switches 500 and 600 when they are closing or opening.

Heating switch 500 closes if the duct air temperature rises over a desired upper temperature setting to enable the receiver to supply power to the duct fan motor to provide more hot air to a particular room when the heating unit or furnace is operating.

Cooling switch 600 closes if the duct air temperature falls below a desired lower temperature setting to enable the receiver to supply power to the duct fan motor to provide more cool air to a particular room when the air conditioning unit is operating. When the ambient temperature is between a desired range of temperatures, the cooling and heating switches are both in the open position preventing the duct fans from operating needlessly.

Figure 7A:
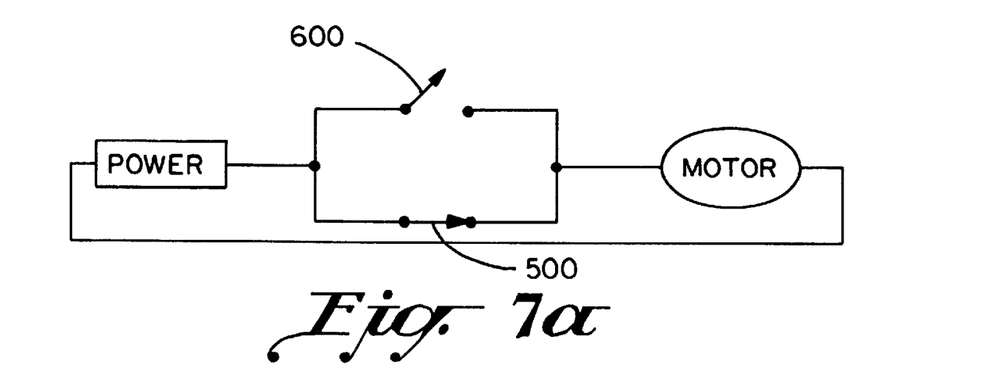
FIG. 7a is a schematic illustration of the thermostatic switch configuration of the present invention when the duct air temperature is above an upper temperature set point.
Figure 7B:
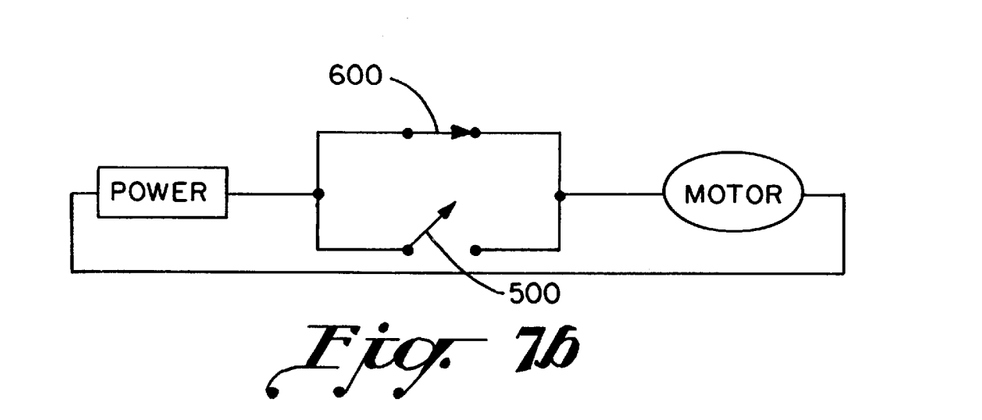
FIG. 7b is a schematic illustration of the thermostatic switch configuration of the present invention when the duct air temperature is below a lower temperature set point.
Figure 7C:
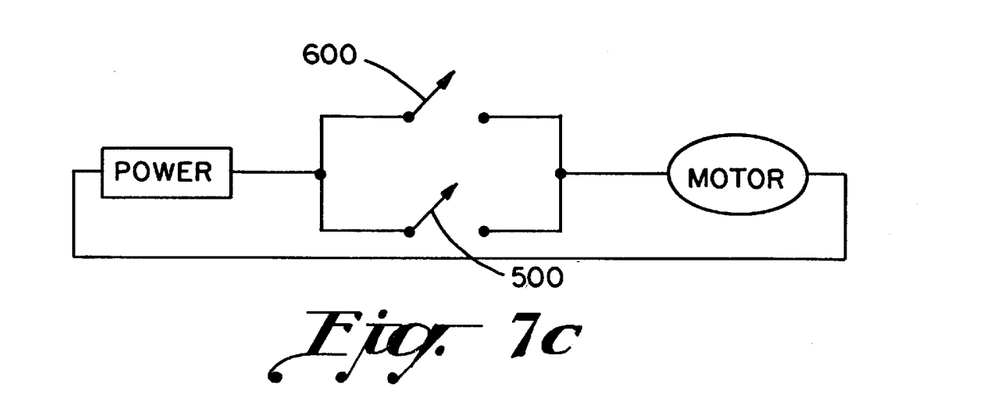
FIG. 7c is a schematic illustration of the thermostatic switch configuration of the present invention when the duct air temperature is between the upper and lower temperature set points.

In the preferred embodiment, as shown in schematic form in FIG. 7a, heating switch 500 closes when the duct air temperature rises over about 88° F. In FIG. 7b what is shown is that cooling switch 600 closes when the duct air temperature falls below about 65° F. Finally, in FIG. 7c what is shown is that both switches 500 and 600 are open when the duct air temperature is within the range of 65° F. and 88° F. It must be understood, however that the heating and cooling switches may be designed to open and close at any fixed temperature calibration point.

Radio frequency signals are used instead of infrared so that the transmitter does not have to be in the line of sight of the receiver to operate the damper or duct fan. With radio frequency signals, objects between the transmitter and receiver will not interfere with the operation of the system. Therefore, the transmitter may be placed anywhere within a room and still communicate with the receiver.

In operation, damper 22 is spliced into an existing duct that feeds air into a particular room that is either over or under cooled or heated. Duct fan ends 94 and 96 and fitted to the ends of the ducts where a section has been removed or cut out. Power cables are then attached to cables 300a,b of receiver 98. Also, the channel selector switch is set to receive a unique radio frequency transmission code from transmitter 400.

Transmitter 400 is placed in a room that is either under or over cooled or heated and turned on. A desired temperature setting is programmed in using buttons 402 and 404. The thermostat will then monitor the ambient temperature against the desired temperature setting. If there is a difference between the two temperatures, the thermostat will then trigger the transmitter to send a radio frequency control signal to the receiver to activate the duct fan.

For example, during the summer months, the central air conditioning unit may not be providing enough cool air to a given room. As the ambient room temperature begins to rise, the thermostat will detect the temperature difference between the desired temperature setting and the ambient temperature. In turn, the thermostat will trigger the transmitter to send a radio frequency control signal to the receiver. The receiver upon receiving the radio frequency control signal will supply power to duct fan motor 86. Duct fan motor 86 then rotates fan 84 to increase the rate of airflow exiting the duct. More cool air then flows from the duct into the under cooled room. As a result of the increased supply of cool air, the room temperature drops back to a more comfortable setting.

When the ambient temperature reaches the desired temperature setting, the thermostat triggers the transmitter to send another radio frequency control signal to deactivate the duct fan. When the receiver receiving the radio frequency control signal, it stops supplying power to the duct fan motor deactivating it.

If several ducts feed into one room, duct fans may be spliced into each duct. All of the duct fans can be set to receive the same radio frequency transmission code so as to be operated by a single transmitter. It is contemplated, however, that each duct fan may be set to receiver a different radio frequency transmission codes. In this manner, they can each be separately controlled using different transmitters set to transmit corresponding radio frequency transmission codes.

Alternatively, a damper may be spliced into a single duct or into a plurality of ducts. When a plurality of dampers are utilized, they can all be set to respond to the same radio frequency transmission code so that they may all be operated by a single transmitter.

In yet another embodiment, a damper and duct fan may be spliced into a duct in series with one another. Again, the duct fan and damper receivers may be set to the same radio frequency transmission code to be operated by a single transmitter.

The present invention has been described and illustrated with references to one or more preferred embodiments. Nevertheless, it will be understood that various modifications, alterations and substitutions may be apparent to one of ordinary skill in the art, and that such modifications, alterations and substitutions may be made without departing from the essential invention. Accordingly, the present invention is defined only by the following appended claims.

What is claimed is:

1. A retrofit temperature regulating apparatus independently regulating airflow from a central heating ventilation and air conditioning system comprising:

a housing, the housing having at least one tapered end for connection to an existing duct of a central heating ventilation and air conditioning system;

means for controlling the rate of airflow supplied from the central heating ventilation and air conditioning system exiting a duct into a selected area within the housing operating independently from the central heating ventilation and air conditioning system airflow controls;

means for transmitting a radio frequency command signal in response to a change in temperature from a predetermined setting;

means for receiving the radio frequency command signal transmitted from the transmitting means connected to an outer surface of the housing, the radio frequency receiving means supplying power to the airflow rate regulating means; and means for selecting the radio frequency transmission code to be transmitted and received by the transmitting and receiving means respectively connected to the radio frequency receiving means.

2. The apparatus of claim 1, wherein the means for controlling the rate of airflow is a damper comprising a housing, a blade pivotally mounted within the housing, a motor to rotate the blade about its pivotal axis to an open position when supplied with power, and a return spring biasing the blade in a closed position when the motor is not in operation.

3. The apparatus of claim 2, wherein the damper further comprises a pressure relief system preventing the blade to return to a fully closed position to minimize pressure build up within the duct system.

4. The apparatus of claim 1, wherein the means for controlling the rate of airflow is a damper comprising a housing, a blade pivotally mounted within the housing, a motor to rotate the blade about its pivotal axis to a closed position when supplied with power, and a return spring biasing the blade in an open position when the motor is not in operation.

5. The apparatus of claim 1, wherein the means for controlling the rate of airflow is a duct fan comprising a housing, and a motorized fan mounted within the housing, the motor rotating the fan when supplied with power.

6. The apparatus of claim 1, wherein the means for transmitting a radio frequency command signal comprises a portable programmable thermostat and radio frequency transmitter, the transmitter transmitting a radio frequency command signal in response to the thermostat detecting a difference between the ambient temperature and the programmed temperature setting.

7. The apparatus of claim 1, wherein the means for receiving the radio frequency command signal comprises a radio frequency receiver, which supplies power to the airflow rate controlling means upon receiving a radio frequency command signal from the transmitting means.

8. The apparatus of claim 1, wherein the means for selecting the radio frequency transmission code comprises a channel selector switch assembly, the switch assembly having an n number of switches providing $2^n$ number of unique radio frequency transmission codes that can be transmitted and received by the transmitting and receiving means.

9. The apparatus of claim 8, wherein the number of switches equals four, and the number of unique radio frequency transmission codes that can be transmitted and received by the transmitting and receiving means is sixteen.

10. The apparatus of claim 1 further comprising means for deactivating the regulating means when the duct air temperature is between a selected upper and lower temperature range.

11. The apparatus of claim 10, wherein the selected upper and lower temperature range is about 125° F. to about 55° F., and more preferably, in a temperature range of about 88° F. to about 65° F.

12. The apparatus of claim 10, wherein the means for deactivating the regulating means comprises at least two thermostatic switches.

13. A retrofit temperature regulating apparatus independently regulating airflow from a central heating ventilation and air conditioning system comprising:
    a housing, the housing having at least one tapered end for connection to an existing duct of a central heating ventilation and air conditioning system;
    an airflow rate controller within the housing to increase or decrease the flow of air supplied from a central heating ventilation and air conditioning system exiting a duct into a selected area, the controller operating independently from the central heating ventilation and air conditioning system airflow controls;
    a portable programmable thermostat and radio frequency transmitter, the transmitter transmitting radio frequency command signals in response to the thermostat detecting a difference between the ambient temperature and the programmed temperature setting;
    a radio frequency receiver connected to an exterior surface of the housing which supplies power to the airflow rate controller upon receiving a radio frequency command signal from the radio frequency transmitter; and
    a channel selector switch assembly connected to the radio frequency receive providing a number of unique radio frequency transmission codes that can be transmitted and received by the radio frequency transmitter and radio frequency receiver.

14. The apparatus of claim 13, wherein the channel selector switch assembly is comprised of four switches, and the number of unique radio frequency transmission codes that can be transmitted and received by the transmitting and receiving means is sixteen.

15. The apparatus of claim 13 further comprising at least two thermostatic switches for deactivating the airflow rate controller when the duct air temperature is between a selected upper and lower temperature range.

16. The apparatus of claim 15, wherein the selected upper and lower temperature range is about 125° F. to about 55° F., and more preferably, in a temperature range of about 88° F. to about 65° F.

17. The apparatus of claim 13, wherein the airflow rate controller comprises a damper having a housing, a blade pivotally mounted within the housing, a motor to rotate the blade about its pivotal axis to an open position when supplied with power, and a return spring biasing the blade in a closed position when the motor is not in operation.

18. The apparatus of claim 17, wherein the damper further comprises a pressure relief system preventing the blade to return to a fully closed position to minimize pressure build up within the duct system.

19. The apparatus of claim 13, wherein the airflow rate controller comprises a duct fan having a housing, and a motorized fan mounted within the housing, the motor rotating the fan when supplied with power.

20. The apparatus of claim 13, wherein the airflow rate controller comprises a duct fan and damper connected to one another in series.

21. The apparatus of claim 20, wherein the selected radio frequency transmission code of the duct fan and damper receivers are the same so that both the damper and the duct fan may be controlled by a single radio frequency command signal transmitter.

22. The apparatus of claim 21, wherein the duct fan motor can be operated along abroad range of speeds.

23. The apparatus of claim 22 wherein the duct fan motor is set to operate at three different speeds.

24. A retrofit damper assembly with independent wireless damper control, the assembly comprising:
    a damper operating independently from central heating ventilation and air conditioning system controls having a housing, the housing having at least one tapered end for connection to a duct of similar size, a blade pivotally mounted within the housing, a motor to rotate the blade about its pivotal axis to a selected position when supplied with power, and a return spring biasing the blade in the selected position when the motor is not in operation;
    a portable programmable thermostat and radio frequency transmitter, the transmitter transmitting radio frequency command signals in response to the thermostat detecting a difference between the ambient temperature and the programmed temperature setting;
    a radio frequency receiver connected to an exterior surface of the housing which supplies power to the damper upon receiving a radio frequency command signal from the radio frequency transmitter; and a channel selector switch assembly connected to the radio frequency receiver providing a number of unique radio frequency transmission codes that can be transmitted and received by the radio frequency transmitter and radio frequency receiver.

25. The assembly of claim 24 further comprising at least one temperature sensing device connected in circuit to the damper sensing the duct air temperature, the sensing device activating the motor pivoting the blade when the sensing device senses the duct air temperature to be at a predetermined temperature and the radio frequency receiver has received a radio frequency command signal supplying power to the motor.

26. The assembly of claim 25 further comprising a pressure relief system preventing the blade to fully close to minimize pressure build up within the duct system.

27. The assembly of claim 26 wherein the channel selector switch assembly is comprised of four switches, and the number of unique radio frequency transmission codes that can be transmitted and received by the transmitting and receiving means is sixteen.

* * * * *